United States Patent Office 3,759,796

Patented Sept. 18, 1973

3,759,796

METHOD OF REPRODUCING MAGNETIZATION PATTERN

Tatsuji Kitamoto, Masashi Aonuma, and Kazuhiro Kawaziri, Kanagawa, Japan, assignors to Fuji Photo Film Co., Ltd., Kanagawa, Japan No Drawing. Filed Mar. 29, 1971, Ser. No. 129,131

Claims priority, application Japan, Mar. 27, 1970, 45/25,712

Int. Cl. C04b *35/00;* C23b *7/02;* G11b *5/00*

U.S. Cl. 204—12 9 Claims

ABSTRACT OF THE DISCLOSURE

Reproduction of an original magnetization pattern by forming a magnetic film having a high magnetization resistance on a substrate tape having a magnetization pattern thereby to magnetize said film in the same pattern as that of the substrate, and stripping off said magnetic film from the substrate. The magnetic film is formed by plating or vapor deposition and can be used repeatedly as a master tape to reproduce large quantities of the magnetization pattern by such means as magnetic transfer.

BACKGROUND OF THE INVENTION

Field of the invention

This invention relates to a method of reproducing a magnetization pattern which comprises forming a magnetic layer with a magnetization pattern corresponding to an information signal, and reproducing therefrom a new magnetic recording layer having said pattern.

One example of the utility which the present invention finds is in the manufacture of a master for reproduction of a pattern of a magnetically recorded signal.

Description of the prior art

In the production of large quantities of recorded videotapes by reproducing a video signal recorded on original videotape, it is impossible to raise the relative speed between the tape and the head much higher than that during playback since the playback speed itself is very high. The economical methods of producing recorded videotapes which have been proposed previously include a method wherein the output signal of a playback video tape recorder (VTR) is divided among a plurality of recording video tape recorders to effect reproduction simultaneously; a method wherein a master tape and a slave tape are caused to run in intimate contact with each other and a high frequency magnetic field is applied thereto to effect transfer; or a method wherein a master tape and a slave tape are superposed and wound up, and a magnetic transfer field or heat is applied thereto to effect transfer.

The first of these methods is reliable, but is not suitable for making large quantities of copy because of the limitation on the number of reproducing VTRs that can be used at a time. The second and third methods involve magnetic transfer by applying a magnetic field or heat to a master tape and a slave tape superposed in face-to-face contact, and are superior in that the speed of reproduction can be chosen irrespective of the density of recording. The master to be used in this type of method is desirably one which has sufficiently high coercivity and is stable to a magnetic field or heat to be applied at the time of transfer. If, however, the master tape has too high a coercivity, it becomes difficult to record the original on it.

SUMMARY OF THE INVENTION

The present invention provides a new method of reproducing an original magnetization pattern which comprises forming a magnetic film on a substrate having a magnetization pattern thereby to magnetize said film in the same pattern as that of the substrate, and stripping off the resulting magnetic film having said magnetization pattern.

According to the method of the present invention, a magnetic layer having the desired high coercivity and simultaneously having a magnetization pattern to be used as a master can be produced with ease. The invention also makes it possible to reproduce a magnetically recorded pattern on a recording medium, in the form of a metal film of high refractive index suited for reading the pattern optically, thereby to form a magnetic layer in which the magnetically recorded pattern can be read by means other than a magnetic head.

Other various applications of the method of the present invention will be understood from the following description.

DESCRIPTION OF THE PREFERRED EMBODIMENTS

In the method of the present invention, an information signal is magnetically recorded as a magnetization pattern on a suitable magnetic recording medium such as magnetic tape, and a magnetic layer is gradually formed thereon by a suitable procedure such as non-electrolytic plating (chemical plating), electric plating or vacuum evaporation. In the case of nonelectrolytic cobalt plating for example, cobalt ions diffuse from a liquid, and are reduced basically at those points where an activator adheres, thereby to form entangled acicular crystals consisting of cobalt metal. We have found that if the substrate used at this time is a magnetized one, a ferromagnetic precipitated film is magnetized in the same direction and has the same magnetization pattern as that of the substrate.

By this method, it is also possible to reproduce a magnetization pattern on a film having a very high coercivity, for example 1000 oe., which is difficult to magnetize by a customary method. For example, after a film of sufficient thickness having a reproduced magnetic pattern has been formed in this way on the substrate having the original magnetization pattern, a support film having applied thereto an adhesive layer is stuck thereto, and the film having the reproduced magnetization pattern is then stripped off. Thus, a new magnetic layer with a reproduced magnetization pattern can be obtained.

The following examples will more specifically illustrate the present invention, without limiting the same.

EXAMPLE 1

A tape designed for use in a home video tape recorder was used. This tape was prepared by coating $\gamma$-$Fe_2O_3$ on a polyethylene terephthalate tape of a thickness of about 25$\mu$, and slitting to a width of ½ inch and had recorded thereon a gray scale video signal. The surface of the magnetic layer of this tape was immersed in a neutral defatting agent (for example, Super-Coater, produced by Nihon Hyurudo Kagaku) and then in a solution of benzotriazole. It was further immersed in a dilute hydrochloric acid solution of stannous chloride, and a dilute hydrochloric acid solution of palladium chloride. The surface of the magnetic layer so treated was chemically plated from a bath of the following formulation at 80° C. for 30 minutes at a pH of 9.0 (adjusted with a sodium hydroxide solution).

Formulation of the bath

| | G./liter |
|---|---|
| $CoSO_4.7H_2O$ | 7 |
| $Na_2C_4H_4O_6.2H_2O$ | 57.5 |
| $H_3BO_3$ | 15.5 |
| $NaH_2PO_2.H_2O$ | 10.6 |

A nitrile rubber type binding agent was coated on the magnetic plated layer so obtained. A 25μ thick polyethylene terephthalate film was bonded on a magnetic plated layer, and the magnetic plated layer was separated from the $\gamma$-$Fe_2O_3$ magnetic layer. Thus, a magnetic plated tape consisting of the polyethylene terephthalate film and the magnetic plated layer was obtained.

The plated layer was a Co-P alloy layer with a thickness of 0.6μ. The magnetic plated tape had magnetic characteristics expressed by a coercivity of 800 oe. and a squareness ratio (Br/Bm) of 0.75. It was found that the same gray scale video signal as in the $\gamma$-$Fe_2O_3$-coated tape was recorded on the magnetic plated surface of the resulting tape.

The plated tape and another ordinary $\gamma$-$Fe_2O_3$-coated tape designed for use in a home VTR were wound up simultaneously on a reel with both magnetic layers being in intimate contact with each other, and a transfer magnetic field of about 500 gausses was applied to the tapes in this state to transfer the video signal.

When the transfer tape was played back, the output signal of the original gray scale was obtained.

The signal recorded on the magnetic plated layer was not erased by the application of a transfer magnetic field of 500 gausses, and could be repeatedly used as a master tape.

EXAMPLE 2

A Co-P alloy layer having a magnetization pattern was formed by chemical plating under the same conditions as set forth in Example 1 on a polyethylene terephthalate film having a width of ½ inch and a thickness of about 25μ and coated with $\gamma$-$Fe_2O_3$. The magnetic plated layer had a thickness of 0.5μ and magnetic characteristics expressed by an Hc of 800 oe. and a squareness ratio (Br/Bm) of 0.75.

A transfer tape (an ordinary videotape coated with $\gamma$-$Fe_2O_3$ designed for use in a home VTR) and the original tape having formed thereon the magnetic plated layer were wound up on a reel with both magnetic layers being in intimate contact with each other, and a transfer magnetic field of about 500 gausses was applied to the tapes in this state to transfer the magnetization pattern. When the transfer tape was played back, the output of the original video signal could be obtained. The original tape having formed thereon the magnetic plated layer could be repeatedly used as a master tape.

EXAMPLE 3

Gray scale video signal was recorded as in Example 1 on a magnetic disc produced by chemically plating a Co-P alloy layer on a 25μ thick polyethylene terephthalate film base. The alloy layer had an Hc of 280 oe. and a squareness ratio (Br/Bm) of 0.78. The magnetic disc was further electrically plated from a bath of the following formulation at 50° C. for 5 minutes at a pH and a current density maintained at 4.2 and 1 A/dm.$^2$, respectively.

Formulation of the bath

| | G./liter |
|---|---|
| $NiSO_4.6H_2O$ | 26.4 |
| $CoSO_4.7H_2O$ | 28.2 |
| $NH_4Cl$ | 27 |
| $NaH_2PO_2.H_2O$ | 4.2 |

The electroplated coating had a thickness of 0.6μ, an Hc of 800 oe. and a squareness ratio (Br/Bm) of 0.78. The original signal recorded previously on the chemical plated layer was directly re-recorded on the electroplated layer.

The magnetic disc was brought into intimate contact with the magnetic layer of a transfer magnetic disc, and a transfer magnetic field of 500 gausses was applied thereto. When the transfer magnetic disc was played back, the output of the original signal could be obtained. This example demonstrates that a master having a relatively small coercivity and having susceptibility to magnetic erosion in a transfer magnetic field can be reinforced by the method of the invention to provide an excellent master.

As shown in the foregoing examples, according to the present invention, a substrate having a magnetic layer with a coercivity of 300 oe, or less is plated with a magnetic film having a high coercivity while the substrate has recorded thereon an information signal. This makes it possible to easily record a magnetization pattern corresponding to the signal on the magnetic film obtained by plating.

While the examples have been given with regard to chemical plating and electroplating, it should be understood that a magnetic film having sufficient effects intended by the present invention can be produced by such procedures as vacuum evaporation and gaseous plating. For example, the reproduction of an original magnetization pattern can be obtained by thermally decomposing cobalt carbonate under controlled conditions of temperature and rate of flow.

What is claimed is:

1. A method for reproducing an original magnetization pattern of a substrate which has a low coercivity of less than 300 oe. to form a master of high coercivity capable of repeated use, said method comprising plating onto the low coercivity substrate a ferromagnetic material of high coercivity thereby forming a plated magnetic film of said ferromagnetic material of high coercivity, said plated magnetic film having the same magnetization pattern as said original magnetization pattern.

2. A method according to claim 1 further comprising stripping said plated magnetic film from the substrate by bonding a support film to the plated magnetic film with an adhesive and stripping off the plated magnetic film to form an assembly comprising said support film and said plated magnetic film bonded thereto by said adhesive.

3. A method according to claim 1, wherein said plated magnetic film is formed by chemical plating.

4. A method according to claim 1, wherein said plated magnetic film is formed by electroplating.

5. A method according to claim 1 wherein the coercivity of said plated magnetic film is from 800 to 1000 oe.

6. A method of reproducing an original magnetization pattern of a first magnetic recording medium having a coercivity of less than 300 oe. comprising:

(a) forming a plated metallic magnetic film having a high coercivity on the magnetic recording surface of said first magnetic recording medium whereby said plated magnetic film is magnetized in a pattern corresponding to said original magnetization pattern; and (b) transferring the reproduced magnetization pattern of said plated magnetic film to a second magnetic recording medium by intimately contacting said plated magnetic film with the magnetic recording surface of said second magnetic recording medium while applying thereto a transfer magnetic field.

7. A method according to claim 6 further comprising stripping said plated metallic magnetic film from said first magnetic recording medium after step (a) and prior to step (b).

8. A method according to claim 7 wherein said stripping is accomplished by coating onto said plated magnetic film a support film having an adhesive coating and subsequently stripping off said support film whereby said plated metallic magnetic film adheres to said support film being stripped off.

9. A method according to claim 6 wherein the coercivity of said plated magnetic film is from 800 to 1000 oe.

(References on following page)

References Cited

UNITED STATES PATENTS

| | | | |
|---|---|---|---|
| 2,165,027 | 7/1939 | Bitter | 204—12 |
| 2,792,340 | 5/1957 | James | 204—13 |
| 3,556,954 | 1/1971 | Luborsky | 204—28 |
| 3,441,494 | 4/1969 | Oshima et al. | 204—28 |
| 2,927,889 | 3/1960 | Clinehens | 204—13 |
| 3,564,156 | 2/1971 | Griener | 179—100.2 E |
| 2,657,932 | 11/1953 | Blaney | 179—100.2 E |
| 2,943,908 | 7/1960 | Hanna | 346—74 MP |
| 3,523,824 | 8/1970 | Powers et al. | 117—240 |
| 2,686,229 | 8/1954 | Blancy | 179—100.2 E |

THOMAS M. TUFARIELLO, Primary Examiner

U.S. Cl. X.R.

117—240; 179—100.2 E; 346—74 MP